US005128824A

United States Patent [19]

Yaworski et al.

[11] Patent Number: 5,128,824

[45] Date of Patent: Jul. 7, 1992

[54] DIRECTIONALLY VENTED UNDERGROUND DISTRIBUTION SURGE ARRESTER

[75] Inventors: Harry G. Yaworski, Easton, Pa.; Alan D. Borgstrom, Hackettstown, N.J.

[73] Assignee: Amerace Corporation, Hackettstown, N.J.

[21] Appl. No.: 658,211

[22] Filed: Feb. 20, 1991

[51] Int. Cl.[5] .......... H02H 7/04
[52] U.S. Cl. .......... 361/127
[58] Field of Search .......... 361/127, 132

[56] References Cited

U.S. PATENT DOCUMENTS

| | | | |
|---|---|---|---|
| 3,586,914 | 11/1969 | Foitzik et al. | 361/127 |
| 3,727,108 | 4/1973 | Westrom | 361/127 |
| 4,314,302 | 2/1982 | Baumbach | 361/119 |
| 4,686,603 | 8/1987 | Mosele | 361/127 |
| 4,930,039 | 5/1990 | Woodworth et al. | 361/127 |

FOREIGN PATENT DOCUMENTS

| | | | |
|---|---|---|---|
| 0008181 | 2/1980 | European Pat. Off. | 361/127 |
| 2324744 | 6/1974 | Fed. Rep. of Germany | 361/127 |
| 0008856 | 1/1979 | Japan | 361/127 |

*Primary Examiner*—Steven L. Stephan
*Assistant Examiner*—Thomas M. Dougherty
*Attorney, Agent, or Firm*—Lerner, David, Littenberg, Krumholz & Mentlik

[57] ABSTRACT

The invention is directed to the provision of an external shield about the periphery of the housing of a surge arrester containing one or more arrester devices to provide an expansion limiting device which permits the housing to expand to a degree necessary to permit the expulsion of arc-generated gases within the housing while serving to help to limit the total expansion to a level below the elastic limit of the housing to prevent its destruction and permit its recovery after the gases have been dissipated. The shield may be made of metal, elastomeric materials, reinforced elastomeric materials or plastic, and the shield may be supported about the housing by an external strap of metal, plastic or elastomeric materials or may be supported by a plurality of fins arranged along the periphery of the housing and engaging an edge of the shield on its internal surface.

15 Claims, 3 Drawing Sheets

DIRECTIONALLY VENTED UNDERGROUND DISTRIBUTION SURGE ARRESTER

CO-PENDING APPLICATIONS

U.S. patent application No. 07/483,656 filed Feb. 23, 1990 for Surge Arrester With Rigid Insulation Housing by Harry G. Yaworski and Larry N. Siebens and assigned to the Assignee of the instant application.

FIELD OF THE INVENTION

The invention is directed to the field of surge arresters to protect high voltage systems from the effects of overvoltage incidents created by lightening strikes and, more particularly, to the construction of such surge arresters to minimize the chance of injury to personnel or equipment due to the catastrophic failure of such surge arresters during overvoltage incidents.

DESCRIPTION OF THE PRIOR ART

Surge arresters used to protect underground and overhead high voltage electrical systems widely employ metal oxide varistor elements to provide either a high or a low impedance current path between the arrester terminals depending on the voltage appearing across the varistor elements themselves. More particularly, at the system's steady state or normal operating voltage, the varistor elements have a relatively high impedance. As the applied voltage is increased, as in response to a lightening strike, their impedance decreases until the voltage appearing across the elements reaches their breakdown voltage, at which point their impedance rapidly decreases towards zero and the varistor elements become highly conductive. In this highly conductive condition, the varistor elements serve to conduct the resulting transient follow-on current to ground. As the transient overvoltage due to the strike and the follow-on current dissipate, the varistor elements, impedance increases effectively removing the short to ground and restoring the varistor elements and electrical system to their normal steady state condition.

Occasionally, the transient condition or a succession of such transient conditions within a short time may cause some level of injury or damage to one or more of the varistor elements. Damaging of sufficient severity can result in thermal runaway and subsequent arcing within the arrester enclosure, leading to extreme heat generation and gas evolution as the internal components in contact with the arc are vaporized. This gas evolution causes the pressure within the arrester to increase rapidly until it is relieved by either a pressure relief means or by the rupture of the arrester enclosure. The catastrophic failure mode of arresters under such conditions may include the expulsion of components or component fragments in all directions. Such failures may pose a potential risks to personnel and equipment in the vicinity. Equipment may be particularly at risk when the arrester is housed within the equipment it is meant to protect as in the tank of a transformer for example. Personnel may be at risk if in a cable vault or equipment room where they may be in close and confined proximity to an exploding arrester.

Different efforts made to date to minimize the possibility for injury have generally dealt with techniques to strengthen the arrester by providing a non-fragmenting liner and outer housing and a pressure relief diaphragm located at its lower end as in U.S. Pat. No. 4,404,614, or a shatterproof arrester housing as in U.S. Pat. No. 4,656,555. In U.S. Pat. No. 4,910,632, gas passages are provided which end in their wall sections which are melted to allow the gases to escape and reduce the internal pressure on the remainder of the insulating housing. U.S. Pat. No. 4,930,039 provides a liner having outlets formed in the walls thereof for venting ionized gases generated within the liner by internal arcing. This prevents the generation of internal pressure which could otherwise cause a fragmenting failure mode of the arrester.

Because of the placement of dead front underground distribution surge arresters in cable vaults or equipment rooms, the industry has determined that in the event of an arrester failure it would be safest and thus most desirable to have any arrester components or component fragments exit the arrester housing through the bottom and strike the vault or room floor. Also, any hot gases generated within the arrester housing should be depressured, vented and directed-downwardly so as to minimize the potential for injury to any workmen present or to the equipment contained therein. Such a requirement is more stringent than those applied to the devices described above which are for overhead use and are far above the ground, and their venting will have little effect on persons on the ground.

One attempt to control the direction of movement of component fragments exiting a dead front underground distribution arrester under catastrophic failure is shown, described and claimed in the above-identified co-pending application and by this reference made a part hereof.

Referring to FIG. 1, which is FIG. 2 of the co-pending application, it can be seen that the reinforced surge arrester assembly 72 consists of a number of metal oxide varistor (MOV) blocks 74 and end fittings 60 and 70 arranged in a stack and glued to one another by a silver epoxy adhesive surrounded by a preformed rigid tube 78, and the interstices are filled with a filler layer 84. Tube 78 is offset upwardly above the end fitting 60 to provide a downward preferred direction of failure. The presence of the rigid tube 78 acts to create a pressure vessel to not only contain block fragments of blocks that catastrophically fail, but also retain the gases that are evolved by the internal arcing. As a result, the pressure builds within the arrester housing 30 until the entire assembly 72 is ejected from the end of vertical leg 18. The opposing forces generated by the assembly 72 ejection can cause the body 30 to move upwardly in FIG. 1 causing horizontal leg 12 to move free of the bushing insert into which arrester 10 is inserted or to rotate about said bushing insert destroying the insert and the bushing well into which the bushing insert is placed.

SUMMARY OF THE INVENTION

The present invention overcomes the difficulties noted above with respect to prior art devices and seeks to provide protection up to and exceeding the level provided by the co-pending application and without the possible undesired side effects that can be created by extreme gas build-up and catastrophic block failure. The stack of MOV blocks and end fittings suitably joined at their abutting end faces by a silver epoxy paste may be substantially surrounded by a dielectric insulating material to provide an air-free, non-electrically ionizable environment and to rigidify the stack of components by engulfing the blocks and end fittings to form a unitary assembly. The glued block stack may also be used without such pre-insulation.

This assembly may then be inserted into one leg of a dielectric insulating housing with a conductive molded outer shield in the general configuration of the well known cable elbow. The receiving leg having a bore of a diameter less than the diameter of the block assembly and dilatable to receive the assembly therein and thereafter return to its former size to grasp the block assembly in a generally void free interface. Alternatively, as is also well known in the prior art, the block assembly may be placed in a similar housing by molding same about the block assembly. In using a pre-molded housing, the blocks may also be inserted without pre-molding a dielectric insulation about them or even gluing the blocks together. The blocks may be individually inserted and the end spring used to press the mating surfaces into electrical engagement with one another.

Regardless of the manner of inserting or press fitting the block assembly into a housing or molding the housing about the block assembly, the housing will have sufficient resiliency and flexibility so that it can expand and contract in response to gases generated within the arrester. Further, the dielectric insulating material about the block assembly does not adhere to the ceramic coating on the block periphery and is also resilient and flexible enough to expand and contract in the presence of arc-generated gases. The presence of such gases within the arrester may be expelled by the expansion of the assembly insulation layer and the arrester housing allowing such gases to pass out of the arrester between the block peripheries and the insulation layer in both the press fit and molded versions and between the insulation layer and the housing in the press fit version only.

To prevent the arrestor housing from expanding to too great an extent, a restraining, retaining and reinforcing expansion tube is employed. The expansion tube is placed about the outside of the leg containing the block assembly and spaced apart from it by sufficient distance to permit a limited outward expansion of the housing so that the volume of the pressure vessel within the housing can expand to decrease the pressure of the arc-generated gases within the housing and to permit the escape of such gases and to act as a restricting mechanism for the housing itself so that the elastic limits of the EPDM rubber housing is not exceeded. The expansion tube also serves as a protective shield to retain any block fragments from exploding blocks, prevent their sideways travel, and help direct them downwardly and out of the housing. It is an object of this invention to provide an improved surge arrester.

It is an object of this invention to provide an improved surge arrester employing an expansion tube.

It is still another object of this invention to provide an improved surge arrester employing an external expansion tube.

It is another object of this invention to provide an improved surge arrester which can selectively employ an external expansion tube.

It is still another object of this invention to provide an improved surge arrester employing an external expansion tube which is affixed to the exterior of a surge arrester housing permitting limited expansion of such housing in response to the presence of arc-generated internal gas.

It is another object of this invention to provide an improved surge arrester having an expandable housing about the internal arrester elements to vent arc-generated gases within the arrester housing.

It is still another object of this invention to provide an improved surge arrester having an internal expandable housing about the arrester elements to vent arc-generated gases within the arrester housing and an external expansion tube to limit the expansion of the arrester housing during such gas venting while reinforcing the arrester housing.

Other objects and features of the invention will be pointed out in the following description and claims and illustrated in the accompanying drawings which disclose, by way of example, the principles of the invention and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
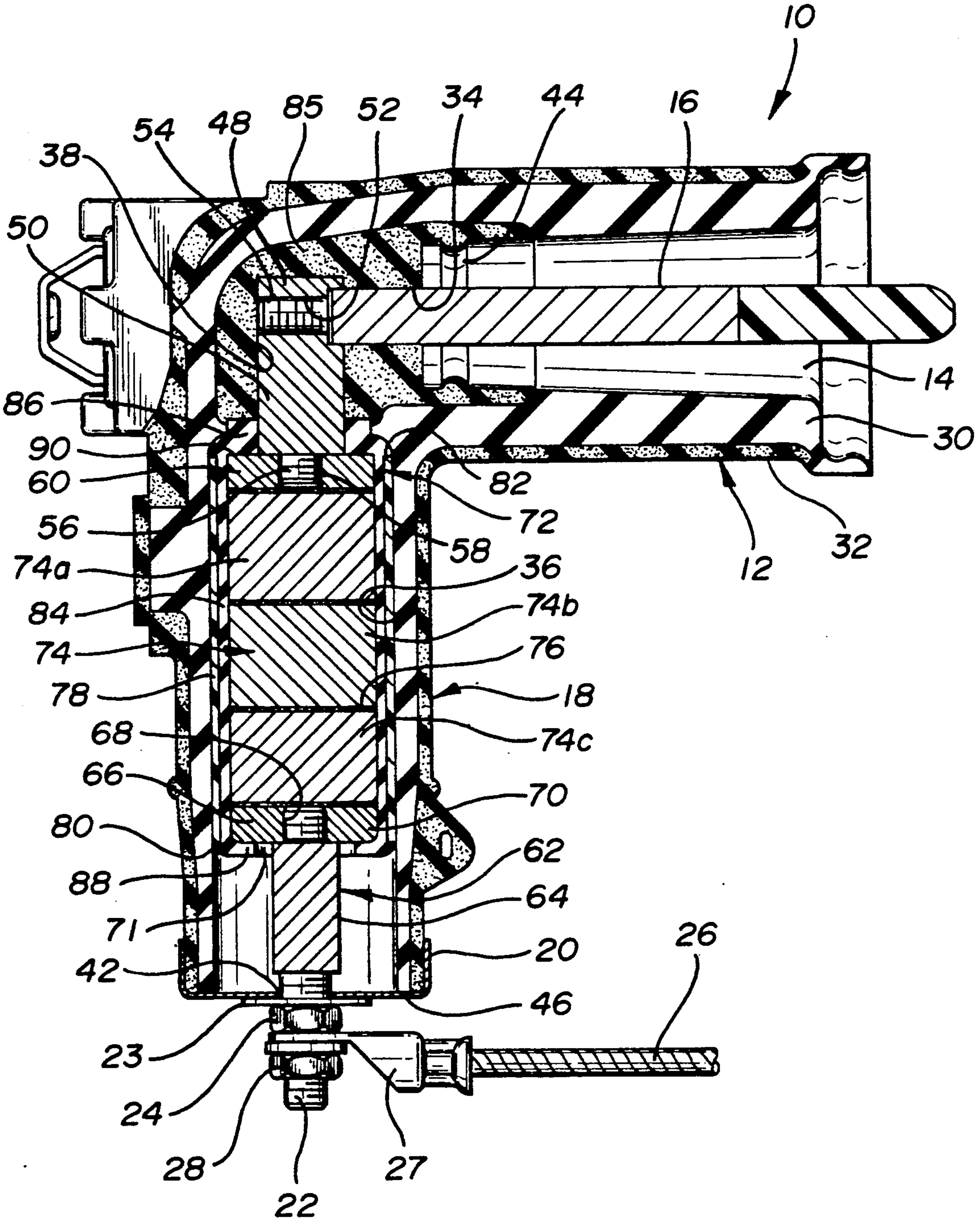
FIG-1 PRIOR ART
FIG. 1 is a side elevation, in section, of a surge arrester according to the prior art and is FIG. 1 the above-identified Co-Pending Application Ser. No. 07/483,656 filed Feb. 23, 1990.
Figure 2:
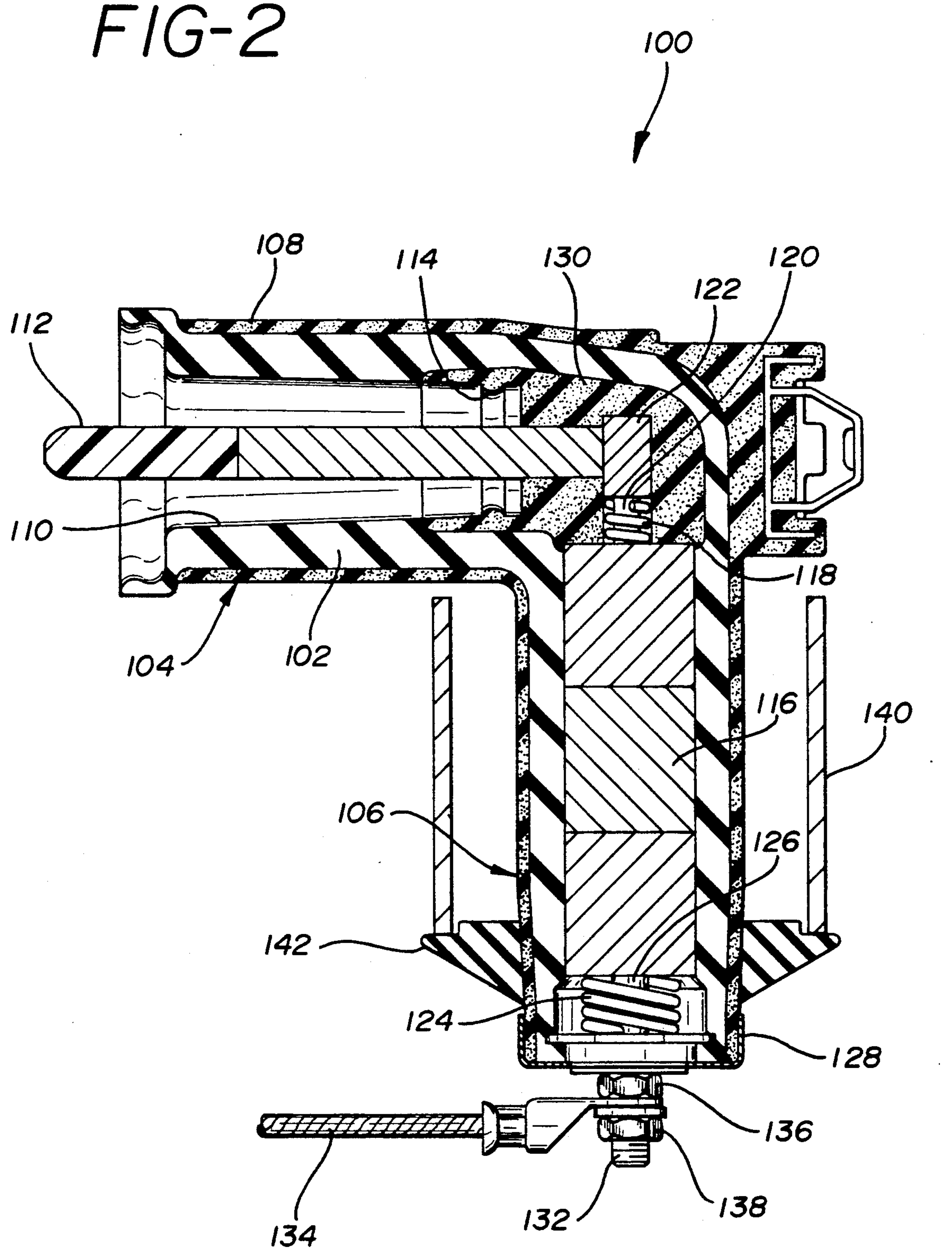
FIG. 2 is a side elevation, in section, of an elbow surge arrester constructed in accordance with the concepts of the invention.

Turning now to FIG. 2, there is shown a first embodiment of a surge arrester 100 constructed in accordance with the concepts of the invention. Although the surge arrester construction is shown housed in an elbow configuration as used in the underground distribution of high voltage currents, it is equally applicable to terminations and transmission line supports and protectors for above-ground transmission or distribution lines and circuits.

A body 102 of resilient, non-tracking, insulating material such as EPDM rubber or butyl rubber is formed in a generally L-shape with a horizontal leg 104 and a vertical leg 106. A shielding layer 108 of conductive material such as semi-conductive EPDM rubber or butyl rubber is placed over a major portion of body 102. The interior of the cavity within leg 104 is tapered to form a receptacle 110 to receive therein the interface of a bushing insert (not shown) and probe 112 is arranged to engage with the female contacts thereof (not shown) in a known manner. The arrester 100 is locked to the bushing insert by engagement of annular detent rib 114 with an annular recess in the bushing insert (not shown).

Inserted in vertical leg 106 is a stack of three metal oxide varistor (MOV) blocks 116 of the type commercially available from Meidensha or General Electric Company, for example, and preferably comprise zinc oxide non-linear resistor material. Although three blocks 116 are shown, the number and size of the blocks employed will depend upon the circuit rating as is well known. The blocks 116 generally have a ceramic collar around the peripheral surfaces thereof to insulate such surfaces and, if desired, the individual blocks may be joined to one another and to any end fittings by a highly electrically conductive silver epoxy paste.

The upper block 116 is brought into contact with a compression spring 118 and shunt 120 to join blocks 116 to probe 112 by means of metal coupling 122 into which probe 112 has been threaded. The lower block 116 is in contact with a further compression spring 124 and shunt 126 held in position at the open end of vertical leg 106 by cap 128. With such an arrangement, once metal coupling 122 and probe 112 are joined within body 102, the blocks 116 can be inserted individually without being glued together or inserted as a group having been previously joined at their interfaces by silver epoxy paste. The completion of the assembly by using cap 128 assures proper electrical assembly by means of compression springs 128 and 118 and shunts 126 and 120 regardless of whether the blocks 116 were previously glued together. A further layer of semi-conductive EPDM 130 surrounds metal coupling 122, spring 118, shunt 120, the top of the upper block 116 and the end of receptacle 110 as is well known in the art. Connected to cap 128 is a threaded stud 132 to which a ground strap 134 can be coupled by means of nuts 136 and 138.

Figure 3:
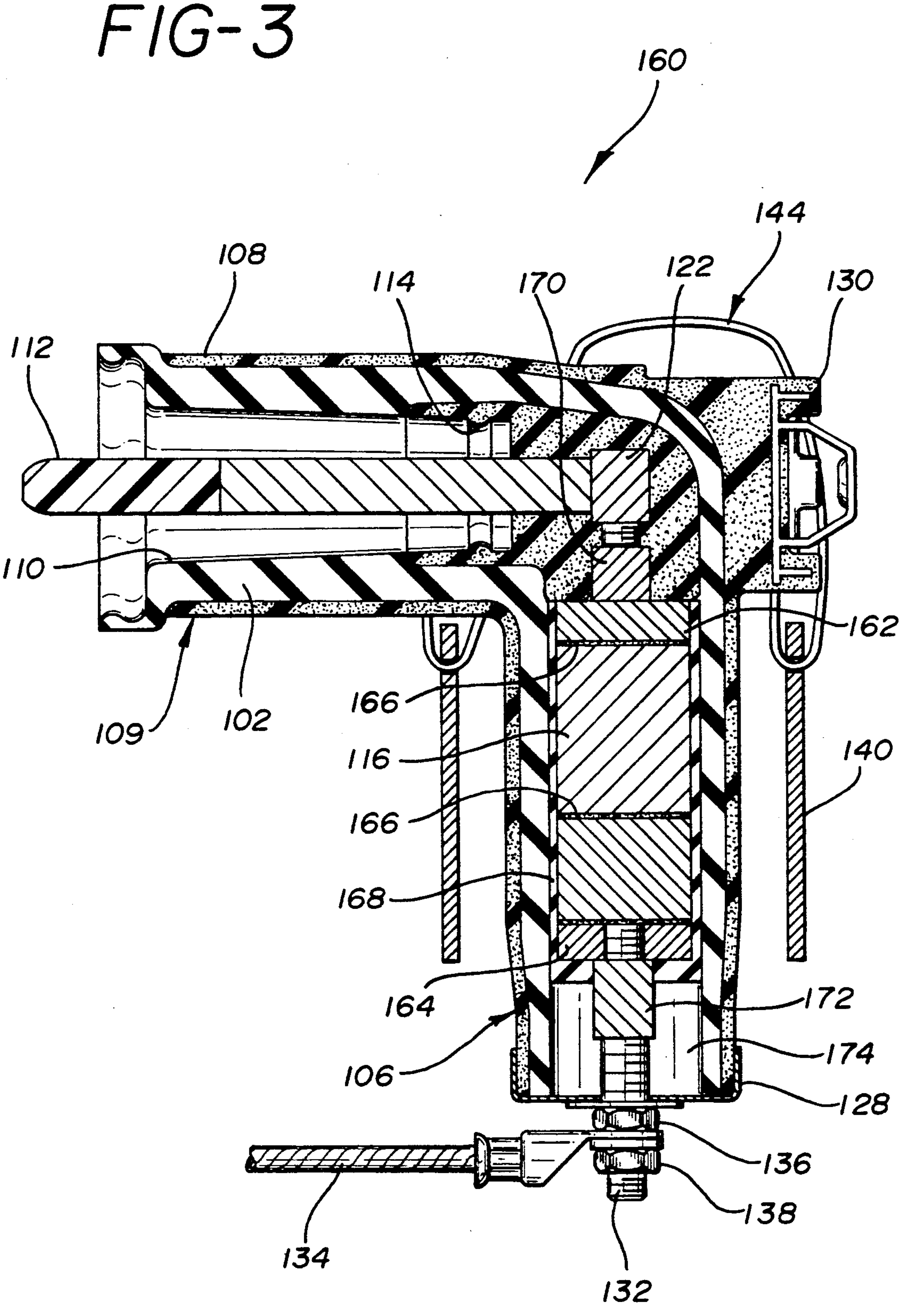
FIG. 3 is a side elevation, in section, of another form of elbow surge arrester constructed in accordance with the concepts of the invention.

Arranged about the exterior of vertical leg 106 is an expansion tube 140 which may be supported by a series of fins 142 extending outwardly from the exterior of vertical leg 106. Alternatively, as is shown in FIG. 3, expansion tube 140 may be supported by a strap 144 extending over horizontal leg 104. Virtually any arrangement may be used which will permit the leg 106 to expand to the extent of the interior diameter of the expansion tube 140. As is shown in FIG. 2, a series of external fins 142 are employed. Although only two fins 142 are shown, in practice three fins at a 120° spacing about the housing periphery are used. Internal fins may also be used and these may be placed at the lower end of vertical leg 106 as is true of fins 142 or at the top of leg 106 near its joinder to horizontal leg 104, or both, as long as the fins do not prevent the desired expansion of the vertical leg 106.

In practice, when arc-generated gases are present within the bore of vertical leg 106, the leg 106 expands to create a spacing between the peripheral edges of blocks 116 and the inner surface of vertical leg 106 that defines the bore. This expansion has two desirable results. The first is that it increases the size of the vessel containing the gases which decreases the pressure exerted by such gas and provides a path for expulsion of the gases from the cavity. The gases may be vented at the interface between the cap 128 and the end of vertical leg 106 to the outside, and thus dissipated. If additional venting is required, vent ports with appropriate unidirectional seals as is well know in the art may be placed in cap 128.

Expansion of the vertical leg 106 is permitted to continue until the outer surface of leg 106 contacts the inner surface of expansion tube 140 at which time expansion of vertical leg 106 terminates. The spacing between the outer surface of vertical leg 106 in its normal condition and its expanded condition is sufficient to allow the expected maximum volume of gas to be expended within a reasonable period of time while keeping the vertical leg 106 within the elastic limits of the material employed to fabricate the housing 102 and shield 108. The fins 142 or strap 144 will not interfere with the return of vertical leg 106 to its normal condition and size once the gases have been dissipated. The expansion tube 140 has the additional advantage of providing yet another shield, one which has not been softened by the hot gases within leg 106 and which can help to restrain any fragments of an exploding block 116 and help direct such fragments down and out of the leg 106.

The expansion tube 140 may be made of metal such as stainless steel, copper, or aluminum or may be a rigid tube formed of filament windings of any suitable continuous fiber such as nylon, rayon, glass and polyethylene impregnated with a resinous material which may be natural or synthetic and may be in the partially cured or uncured state. A glass filament winding with epoxy resins are preferred. The resins are fully cured so that the tube is rigid. Hose with tire cord reinforcement may also be employed. The tube 140 will have a length approximately equal to the height of block 116 stack but should not be so long as to restrict the free movement of the end vertical leg 106 adjacent cap 128 which will undergo the greatest expansion.

Typical dimensions for tube 140 is thickness in the range of 0.031" to 0.250", length 3.00" to 8.00", spacing from the outer wall of leg 106 0.250" to 1.00".

FIG. 3 illustrates the invention as applied to a molded-in arrester block stack. Two MOV blocks 116 are shown in arrester 160 although, as stated above, the number and size of the blocks 116 employed will depend upon circuit parameters. The blocks 116 are glued together at their interfaces and to end fittings 162 and 164 as at 166 with a silver epoxy paste. A layer 168 of a suitable dielectric insulating material such as a thermoset or thermoplastic resin such as glass-filled nylon is applied by injection molding to preassemble the blocks 116 and end fittings 162, 166. The insulating material layer 168 is permitted to engulf portions of the ends of end fittings 162 and 166 to seal the entire unit. A suitable bonding agent is applied to the outer surface of layer 168 prior to its insertion into the final mold where EPDM is injection molded about the block stack assembly and within EPDM shield layer 108 to form the housing 102. In this manner the outer surface of layer 168 is joined to the inner surface of housing 102 to form a void-free interface. This bonding also occurs with metal coupling 122 and shield 130 which are also coated with a bonding agent prior to insertion into the final mold to give a bond between the coupling 122 and the end of probe 112 and shield 130, and shield 130 with body 102 so that the entire region above end fitting 162 is sealed and gas tight.

End fitting 162 is joined to metal coupling 122 by a suitably double threaded metal part 170 which threads into end fitting 162 at a first end and metal coupling 122 at a second. A similar double threaded metal part 172 threads into end fitting 164 at a first end and provides threaded stud 132 at the other.

Expansion tube 140 is shown hung by means of strap 144 about leg 106 of arrester 160. This strap may be metal, nylon, or other suitable thermoset or thermoplastic compositions and suitably contoured to maintain the desired position of expansion tube 140.

When an arc begins and gas is generated it builds up more rapidly in leg 106 than it did in the press fit version of FIG. 2 due to the seal of the metal fitting 122 and shield 130 which prevents any gas from escaping along receptacle 110. This has the desirable effect of preventing the arrester 160 being blown from the mating bushing insert by such gases. The gas will continue to build up until layer 168 is displaced from the peripheral surfaces of blocks 116. As stated above, blocks 116 have a ceramic or other collar about their peripheral surfaces which prevent the layer 168 or the body 102 from adhering to the blocks 116. Thus, as the layer 168 expands away from the peripheral edges of blocks 116, there is a venting passage created which decreases the pressure of the gas by making available a larger volume space and by providing a venting path out of body 102. The gases escape along metal part 172 to even larger chamber 174 and then to the outside of arrester 160 along the joint between cap 128 and shield 108 and along stud 132. If desired, a series of vent ports can be arranged in layer 168 and cap 128 to more rapidly dissipate collecting gases. Suitable one way valve arrangements well known in the art can be employed as required.

The separation of layer 168 from the peripheral surfaces of blocks 116 also results in the expansion of the vertical leg 106 to the extent permitted by expansion tube 140 which retains the material of leg 106 within its limit of expansion and elastic limit so that the leg 106 can recover its original condition when all the gas has been dissipated and the arrester 160 returns to its initial condition. The presence of the expansion tube 140 again is available to help to contain block fragments if the blocks were to explode and to help to direct the fragments downwardly as is true of the device of the co-pending cited application.

The mounting of expansion tube 140 by means of an external strap 144 permits devices which are installed in the field to be retrofitted with a containment device not previously available except during the initial construction as in the co-pending application. Also, the strap mount and fin mount arrangements permit a user to determine the need for such a device and to elect whether or not to purchase same. The same basic arrester can be used for either configuration and the expansion tube added only to those who elect to do so.

While there have been shown and described and pointed out the fundamental novel features of the invention as applied to the preferred embodiments, it will be understood that various omissions and substitutions and changes of the form and details of the devices illustrated and in its operation may be made by those skilled in the art without departing from the spirit of the invention.

The embodiments of the invention in which an exclusive property or privilege is claimed are defined as follows:

1. A protective shield for a surge arrester of the type having a dielectric housing within which are located one or more arrester devices, said shield comprising: a tube having an inner diameter greater than the outer dimension of an associated dielectric housing so as to provide an expansion space therebetween, said tube having a length substantially equal to that of its associated housing; and means to support said tube upon the associated housing to limit the expansion of the associated housing in response to the build-up of gas pressure within said associated housing due to failure of said arrester devices below its elastic limit to prevent destruction of such housing while permitting the venting of such gas pressure from within the associated housing.

2. A protective shield as defined in claim 1, wherein said tube is supported on an associated housing by an external strap means.

3. A protective shield as defined in claim 2, wherein said strap means is a band of elastomeric material.

4. A protective shield as defined in claim 2, wherein said strap means is a band of plastic material.

5. A protective shield as defined in claim 2, wherein said strap means is a band of metal material.

6. A protective shield as defined in claim 1, wherein said tube is constructed of an elastomeric material.

7. A protective shield as defined in claim 1, wherein said tube is constructed of a reinforced elastomeric material.

8. A protective shield as defined in claim 1, wherein said tube is constructed of metal.

9. A protective shield as defined in claim 1, wherein said tube is constructed of metal and said means to support said tube is a plastic strap.

10. A protective shield as defined in claim 1, wherein said means to support said tube upon the associated housing are fins.

11. A protective shield as defined in claim 1, wherein said means to support said tube upon the associated housing are fins which engage an edge of said tube and support it adjacent its associated housing.

12. A protective shield as defined in claim 11, wherein there are three fins arranged at 120° intervals about the periphery of said tube.

13. A protective shield as defined in claim 12, wherein said tube is constructed of an elastomeric material.

14. A protective shield as defined in claim 12, wherein said tube is constructed of a reinforced elastomeric material.

15. A protective shield as defined in claim 12, wherein said tube is constructed of metal.

* * * * *